United States Patent
Song et al.

(10) Patent No.: US 11,440,610 B2
(45) Date of Patent: Sep. 13, 2022

(54) PERSONAL MOBILITY

(71) Applicants: HYUNDAI MOTOR COMPANY, Seoul (KR); KIA CORPORATION, Seoul (KR)

(72) Inventors: Ilsun Song, Seongnam-si (KR); Donghee Seok, Suwon-si (KR); Duck Young Kim, Seongnam-si (KR); Hee Jin Ro, Seoul (KR); Yocheol Jang, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/405,520

(22) Filed: Aug. 18, 2021

(65) Prior Publication Data
US 2022/0204119 A1 Jun. 30, 2022

(30) Foreign Application Priority Data
Dec. 30, 2020 (KR) .................. 10-2020-0187522

(51) Int. Cl.
*B62K 21/26* (2006.01)
*B62K 21/14* (2006.01)
*B62K 11/14* (2006.01)
*B62K 3/00* (2006.01)

(52) U.S. Cl.
CPC .............. *B62K 21/14* (2013.01); *B62K 3/002* (2013.01); *B62K 11/14* (2013.01)

(58) Field of Classification Search
CPC .......... B62K 21/14; B62K 21/26; B25G 1/01
See application file for complete search history.

(56) References Cited

U.S. PATENT DOCUMENTS

| | | | | |
|---|---|---|---|---|
| 606,541 | A * | 6/1898 | Sidway ................. | B62K 21/26 74/551.9 |
| 612,057 | A * | 10/1898 | Richter ................. | B62K 21/26 74/551.9 |
| 880,297 | A * | 2/1908 | Graham-Yooll ....... | B62K 21/14 74/551.9 |
| 1,794,008 | A * | 2/1931 | Forbes .................... | B25G 1/01 81/22 |
| 2,439,636 | A * | 4/1948 | Saracchi ................ | B62K 21/26 74/551.9 |
| 4,535,649 | A * | 8/1985 | Stahel .................... | B62K 21/26 74/551.9 |

(Continued)

OTHER PUBLICATIONS

"Stem (bicycle part)," Wikipedia Page, dated by Wayback Machine to Feb. 27, 2021, url:<https://web.archive.org/web/20210227230307/https://en.wikipedia.org/wiki/Stem_(bicycle_part)#Handlebar_attachment>.*

*Primary Examiner* — Richard W Ridley
*Assistant Examiner* — Brian J McGovern
(74) *Attorney, Agent, or Firm* — McDonnell Boehnen Hulbert & Berghoff LLP

(57) ABSTRACT

A personal mobility includes a steering shaft, a handlebar extending from an upper end of the steering shaft to opposite sides, two grip parts installed on opposite ends of the handlebar, respectively, to be displaceable with respect to the handlebar in a direction of intersecting a longitudinal direction of the handlebar, and a buffer device provided between each of the grip parts and the handlebar to reduce vibration or shock transmitted from the handlebar to the grip part.

6 Claims, 8 Drawing Sheets

(56) References Cited

U.S. PATENT DOCUMENTS

| | | | | |
|---|---|---|---|---|
| 4,739,674 | A * | 4/1988 | Hori | F16F 1/123 |
| | | | | 74/551.9 |
| 4,893,519 | A * | 1/1990 | Corso | B62K 21/26 |
| | | | | 74/551.9 |
| 5,355,552 | A * | 10/1994 | Huang | A63B 60/14 |
| | | | | 473/549 |
| 2004/0129107 | A1* | 7/2004 | Wu | B62K 21/26 |
| | | | | 74/551.9 |
| 2005/0087353 | A1* | 4/2005 | Oki | B25F 5/006 |
| | | | | 173/162.2 |
| 2007/0151404 | A1* | 7/2007 | Kuwata | B62K 21/125 |
| | | | | 74/551.8 |
| 2008/0099302 | A1* | 5/2008 | Yasuda | B62K 21/26 |
| | | | | 192/111.11 |
| 2008/0173126 | A1* | 7/2008 | Madden | B62K 21/26 |
| | | | | 74/551.9 |
| 2008/0235913 | A1* | 10/2008 | Eicher | B25F 5/026 |
| | | | | 173/162.2 |
| 2012/0234130 | A1* | 9/2012 | Yu | B62K 21/26 |
| | | | | 74/551.9 |
| 2014/0053371 | A1* | 2/2014 | Feinstein | B25D 17/043 |
| | | | | 16/430 |
| 2016/0129579 | A1* | 5/2016 | Friedrich | B25D 17/043 |
| | | | | 173/162.2 |
| 2017/0050695 | A1* | 2/2017 | Shikanai | B62J 23/00 |
| 2017/0057589 | A1* | 3/2017 | Moeschler | B62K 21/12 |
| 2020/0149609 | A1* | 5/2020 | Zhang | B25F 5/026 |

* cited by examiner

PERSONAL MOBILITY

CROSS REFERENCE TO RELATED APPLICATIONS

This application is based on and claims priority under 35 U.S.C. § 119 to Korean Patent Application No. 10-2020-0187522, filed on Dec. 30, 2020, in the Korean Intellectual Property Office, the disclosure of which is incorporated by reference herein in its entirety.

BACKGROUND

1. Field

The disclosure relates to a personal mobility capable of reducing vibration and shock transmitted to opposite grip parts during driving.

2. Description of the Related Art

As used throughout this patent, the phrase "personal mobility" is intended to mean any moving personal vehicle, device, machine, instrument, apparatus, or the like. Recently, the use of a personal mobility such as an electric kickboard and an electric bicycle is expanding. The personal mobility may drive on roadways, sidewalks, narrow alleys, and the like by electric power, and may be used as a means for moving a short distance or a means for leisure.

The personal mobility may cause inconvenience to a user because vibration or shock generated from a road surface and wheels while driving is transmitted to opposite grip parts through a steering shaft and a handlebar. A conventional personal mobility is equipped with a shock absorber at a portion connecting a front wheel and a steering device, but there is a limit in reducing vibration or shock transmitted to the grip parts.

SUMMARY

It is an aspect of the disclosure to provide a personal mobility capable of reducing vibration and shock transmitted to opposite grip parts during driving.

Additional aspects of the disclosure will be set forth in part in the description which follows and, in part, will be obvious from the description, or may be learned by practice of the disclosure.

In accordance with an aspect of the disclosure, a personal mobility includes a steering shaft, a handlebar extending from an upper end of the steering shaft to opposite sides, two grip parts installed on opposite ends of the handlebar, respectively, to be displaceable with respect to the handlebar in a direction of intersecting a longitudinal direction of the handlebar, and a buffer device provided between each of the grip parts and the handlebar to reduce vibration or shock transmitted from the handlebar to the grip part.

The grip part may be limited in rotation and longitudinal displacement with respect to the handlebar.

The buffer device may include a plurality of springs interposed between an outer surface of the handlebar and an inner surface of the grip part in a displacement direction and disposed to be spaced apart from each other in a longitudinal direction of the grip part.

The buffer device may further include one or more gas dampers interposed between the outer surface of the handlebar and the inner surface of the grip part in the displacement direction.

The buffer device may include a plurality of gas dampers interposed between an outer surface of the handlebar and an inner surface of the grip part in a displacement direction and disposed to be spaced apart from each other in a longitudinal direction of the grip part.

The handlebar may be rotatably coupled to the upper end of the steering shaft.

The handlebar may include a grip part coupling part, the grip part may include a coupling groove having a rectangular cross-section to be coupled to the outside of the grip part coupling part, and the coupling groove may be provided such that a width in a first direction corresponds to a width of the grip part coupling part in the first direction and a width in a second direction of intersecting the first direction is greater than a width of the grip part coupling part in the second direction.

BRIEF DESCRIPTION OF THE FIGURES

These and/or other aspects of the disclosure will become apparent and more readily appreciated from the following description of the embodiments, taken in conjunction with the accompanying drawings of which.

DETAILED DESCRIPTION

Hereinafter, embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Figure 1:
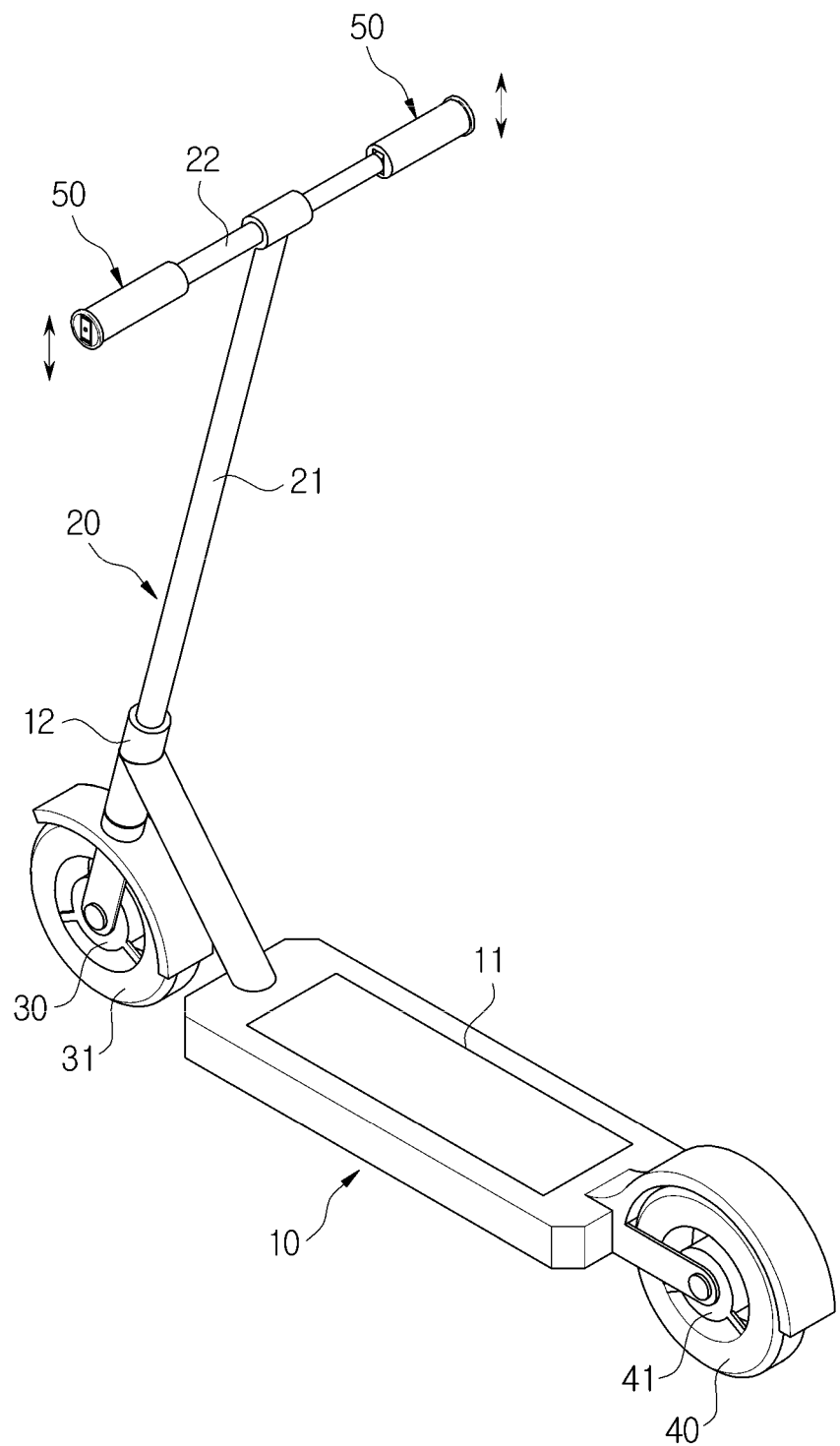
FIG. 1 is a perspective view of a personal mobility according to an embodiment of the disclosure.

As illustrated in FIG. 1, a personal mobility according to an embodiment of the disclosure may include a main body 10 provided with a footrest 11 on an upper end thereof, a steering device 20 provided in front of the main body 10, a front wheel 30 installed at a lower end of the steering device 20, and a rear wheel 40 installed at a rear end of the main body 10.

The front wheel 30 and the rear wheel 40 may include driving motors 31 and 41 for driving and braking devices for braking, respectively. The main body 10 may include a battery for supplying electric power to the driving motors 31 and 41 of the front wheel 30 and the rear wheel 40.

The steering device 20 includes a steering shaft 21 rotatably installed on a shall support part 12 provided at a front end of the main body 10, and a handlebar 22 installed on an upper end of the steering shaft 21 and extending in opposite sides from the steering shaft 21, and two grip parts 50 installed on opposite ends of the handlebar 22, respectively.

Referring to FIGS. 2 to 5, the grip parts 50 installed on the opposite ends of the handlebar 22 are coupled to the outside of the handlebar 22, and are displaceable in one direction (direction of arrow C) of intersecting a longitudinal direction of the handlebar 22. That is, the grip parts 50 are displaceable with respect to the handlebar 22. Between the grip part 50 and the handlebar 22, a buffer device 70 for reducing vibration or shock transmitted from the handlebar 22 toward the grip part 50 is provided.

Figure 3:
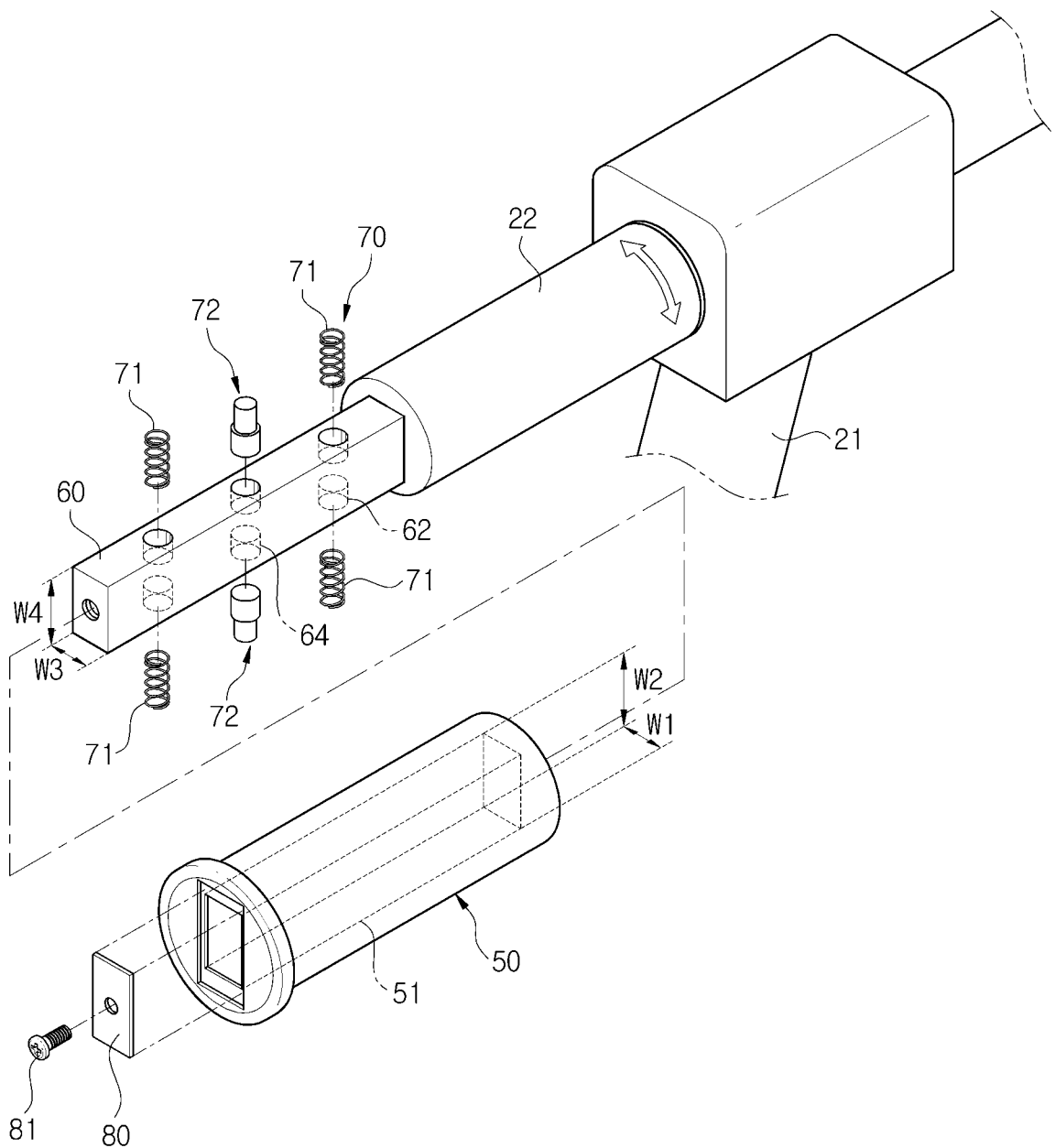
FIG. 3 is an exploded perspective view of the grip part of the personal mobility according to an embodiment of the disclosure.

The handlebar 22 includes a grip part coupling part 60 having a rectangular cross-section provided at a portion to which the grip part 50 is coupled, such that the grip part 50 may be fitted and coupled thereto. The grip part 50 may have a substantially cylindrical shape. The grip part 50 includes a coupling groove 51 having a rectangular cross-section to be coupled to the outside of the grip part coupling part 60. As illustrated in FIG. 3, the coupling groove 51 is provided such that a width W1 in a first direction corresponds to a width W3 of the grip part coupling part 60 in the first direction, and a width W2 in a second direction of intersecting the first direction is greater than a width W4 of the grip part coupling part 60 in the second direction.

Figure 2:
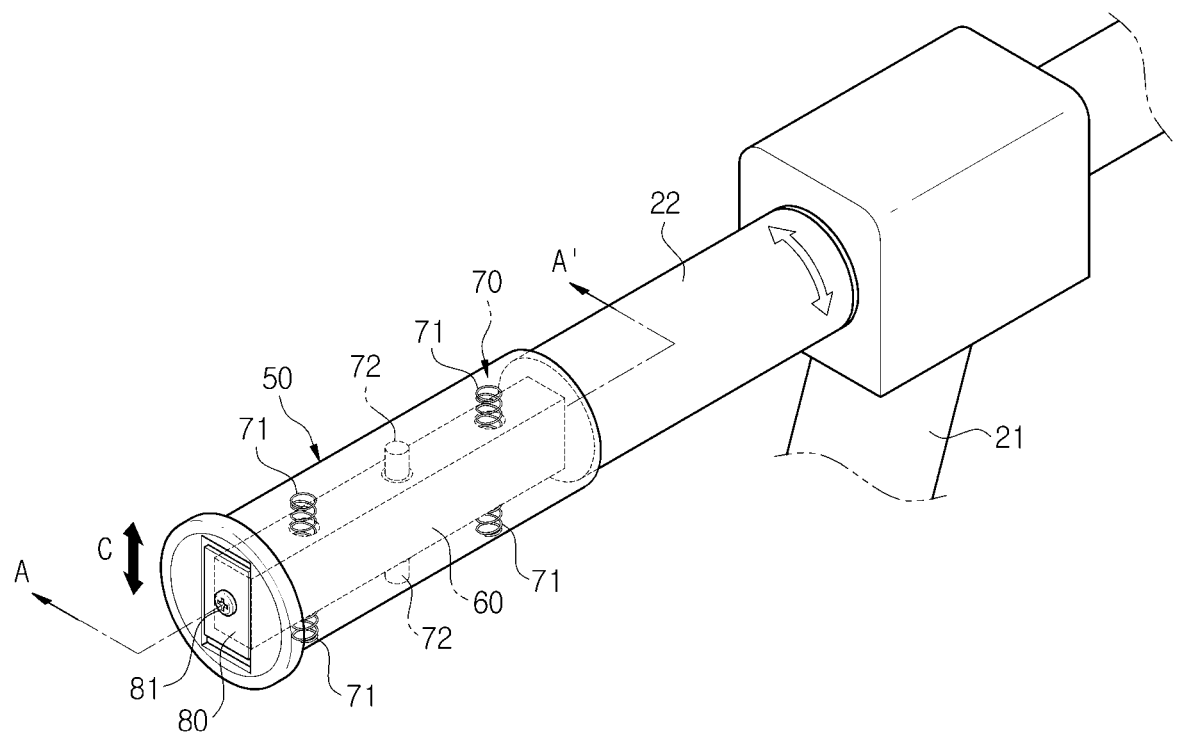
FIG. 2 is a perspective view of a grip part of the personal mobility according to an embodiment of the disclosure.

Therefore, the grip part 50 may move in the direction of arrow C in FIG. 2 in a state of being mounted on an outer surface of the grip part coupling part 60. That is, the grip part 50 may be displaced in the direction of intersecting the longitudinal direction of the handlebar 22.

A support plate 80 may be fastened to an end of the grip part coupling part 60 so that the grip part 50 is not separated in the longitudinal direction of the handlebar 22 after the grip part 50 is mounted. The support plate 80 has a cross-sectional area greater than a cross-sectional area of the coupling groove 51 to support the end of the grip part 50, thereby preventing the grip part 50 from being separated. The support plate 80 may be fixed to the grip part coupling part 60 by fastening a fixing screw 81.

Although the present embodiment illustrates the support plate 80 fastened to the grip part coupling part 60 as a means for preventing separation of the grip part 50, the means for preventing separation of the grip part 50 may be provided in various ways, such as providing interlocking protrusions (not shown) between an inner surface of the grip part 50 and the outer surface of the grip part coupling part 60.

The grip part 50 is limited in movement in the longitudinal direction (longitudinal direction of the handlebar) by the fastening of the support plate 80 and limited in rotation with respect to the handlebar 22. Therefore, the grip part 50 may move only in one direction (direction of arrow C in FIG. 2) of intersecting the longitudinal direction of the handlebar 22.

The buffer device 70 provided between the grip part 50 and the grip part coupling part 60 may include a plurality of springs 71 and a plurality of gas dampers 72.

The plurality of springs 71 may be compression coil springs. The plurality of springs 71 is interposed between inner surfaces of opposite sides of the grip part 50 in the displacement direction (direction of the arrow C) and the grip part coupling part 60 and may be disposed to be spaced apart from each other in the longitudinal direction of the grip part 50. Also, the plurality of springs 71 may be symmetrically installed on upper and lower sides of the grip part coupling part 60 with respect to a center of the grip part coupling part 60. Spring grooves 62 for preventing separation of the spring 71 by accommodating a portion of the springs 71 at respective positions where the plurality of springs 71 is installed are formed on the grip part coupling part 60.

The plurality of springs 71 supports the grip part 50 by providing a buffer in a state of being installed between the grip part 50 and the grip part coupling part 60. Accordingly, the plurality of springs 71 may reduce vibration or shock transmitted from the handlebar 22 to the grip part 50.

Figure 4:
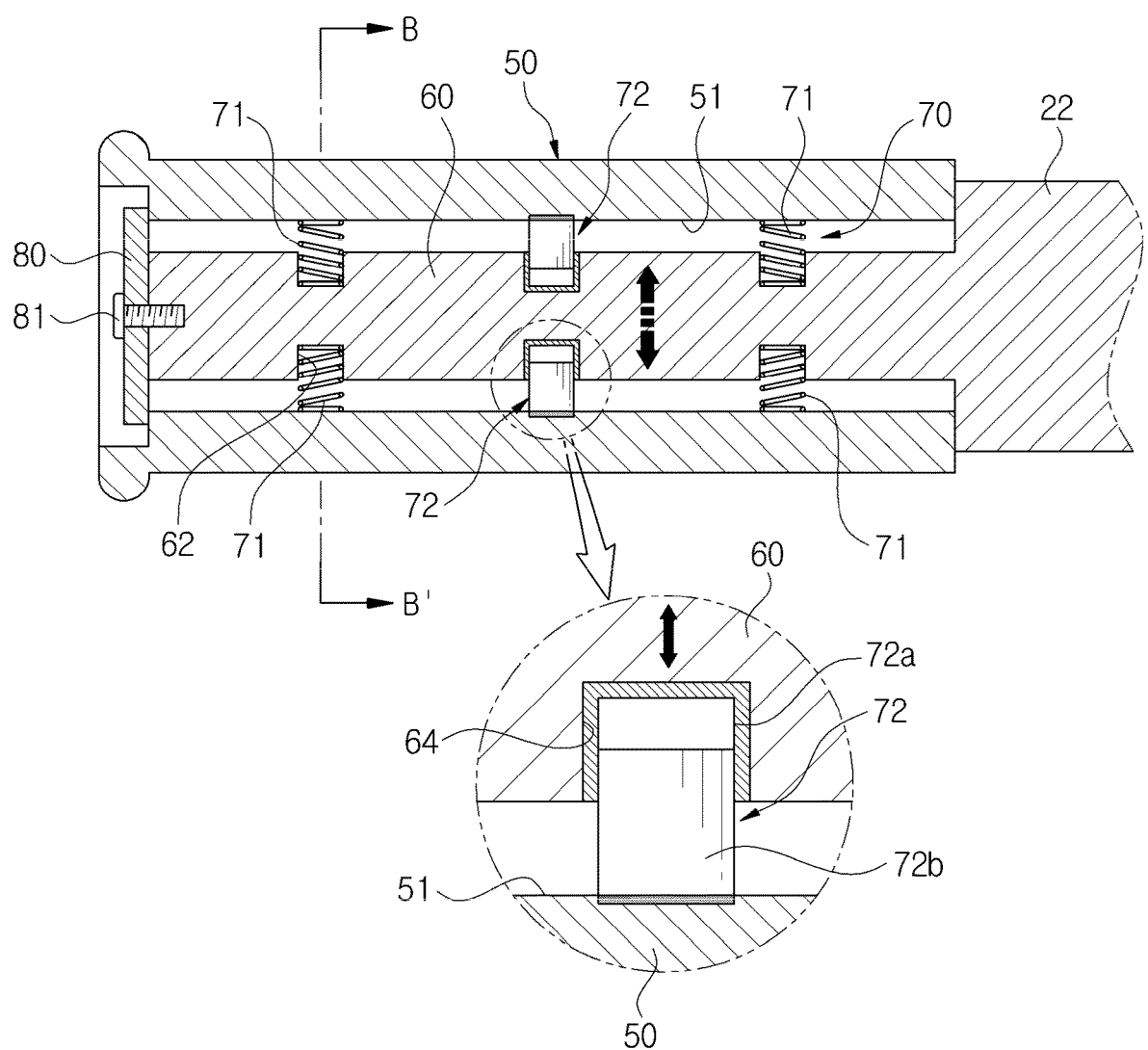
FIG. 4 is a cross-sectional view taken along line A-A' in FIG. 2.
Figure 5:
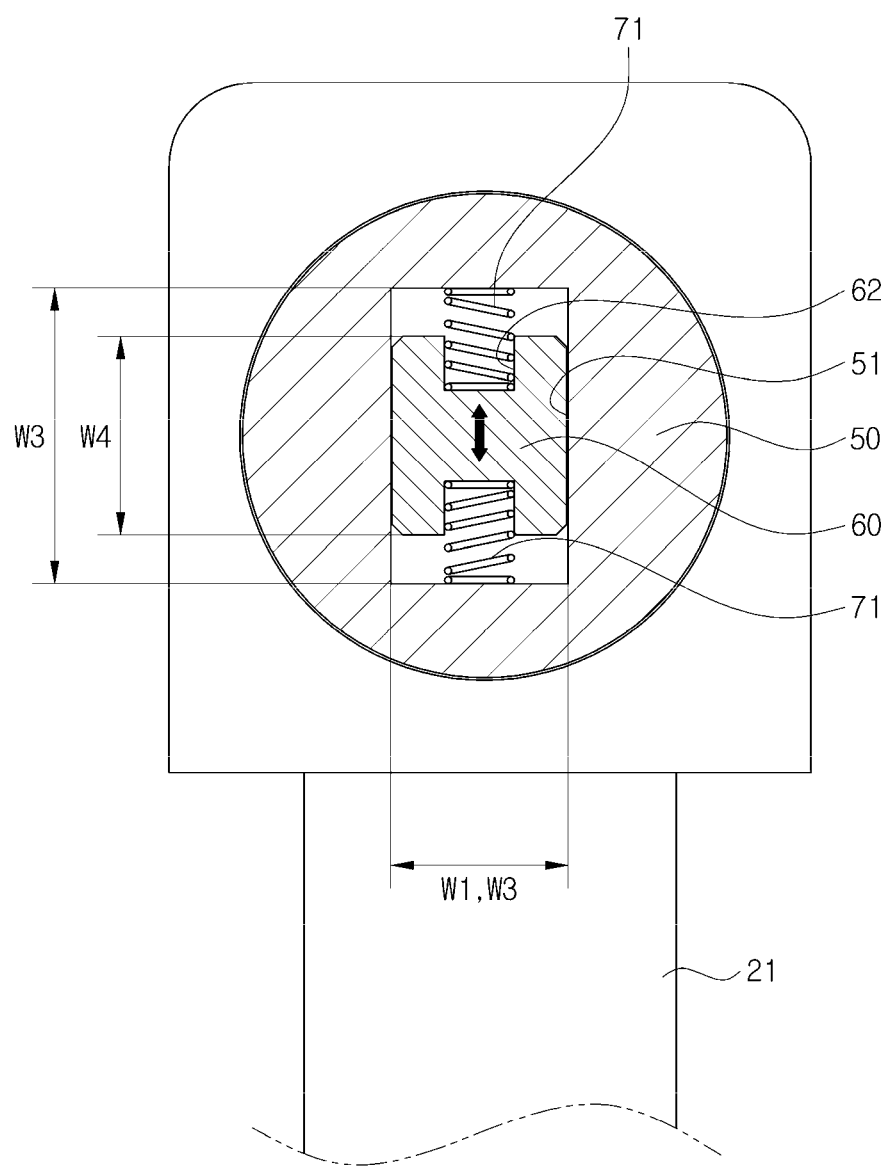
FIG. 5 is a cross-sectional view taken along line B-B' in FIG. 4.

As illustrated in FIGS. 3 and 4, the plurality of gas dampers 72 may be disposed between the plurality of springs 71. The plurality of gas dampers 72 is installed between the inner surfaces of the opposite sides of the grip part 50 in the displacement direction and the grip part coupling part 60, and may be symmetrically installed on the opposite sides of the grip part coupling part 60, like the plurality of springs 71. The grip part coupling part 60 may be provided with damper coupling grooves 64 for accommodating the plurality of gas dampers 72 to prevent separation.

As illustrated in FIG. 4, the gas damper 72 may include a cylinder 72a fixed in a state of being accommodated in the damper coupling groove 64, and a piston 72b coupled to the cylinder 72a to be movable forward and backward in a state of being fixed to the inner surface of the grip part 50. An outer surface of the cylinder 72a may be adhered to an inner surface of the damper coupling groove 64 by an adhesive, and one end of the piston 72b may also be adhered to the inner surface of the grip part 50 by an adhesive.

The gas dampers 72 may suppress excessive vibration of the grip part 50, as well as function to reduce vibration and shock together with the plurality of springs 71. FIG. 4 illustrates that two of the gas dampers 72 are symmetrically installed on the opposite sides of the grip part coupling part 60, but only one of the gas damper 72 may be installed on either side.

The present embodiment exemplifies a case in which the plurality of springs 71 and the plurality of gas dampers 72 are installed together between the inner surface of the grip part 50 and the grip part coupling part 60. However, only the plurality of springs 71 or only the plurality of gas dampers 72 may be installed between the inner surface of the grip part 50 and the grip part coupling part 60.

When the buffer device 70 is composed of only the gas dampers 72, the plurality of gas dampers 72 may be spaced apart from each other in the longitudinal direction of the grip part 50. Also, each of the gas dampers 72 may be filled with compressed gas to have a buffer function and a restoration function.

Figure 6:
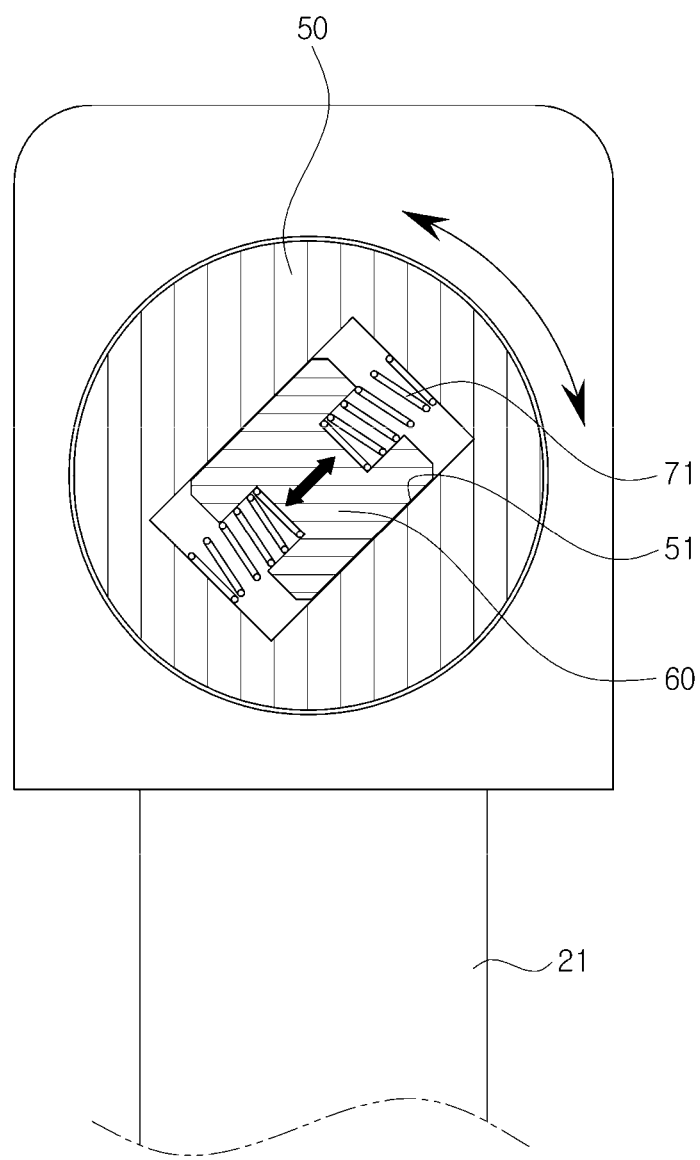
FIG. 6 is a cross-sectional view illustrating a state in which the grip part of the personal mobility according to an embodiment of the disclosure is rotated.
Figure 7A:
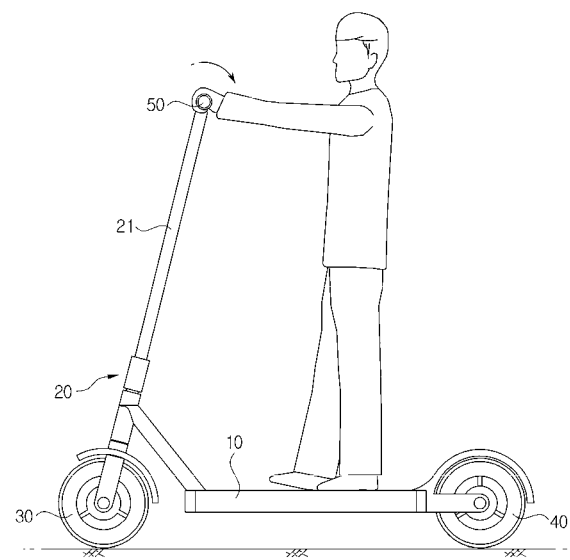
FIGS. 7A and 7B illustrate a case in which a relatively short person uses and a case in which a relatively tall person uses, respectively, the personal mobility according to an embodiment of the disclosure.
Figure 7B:
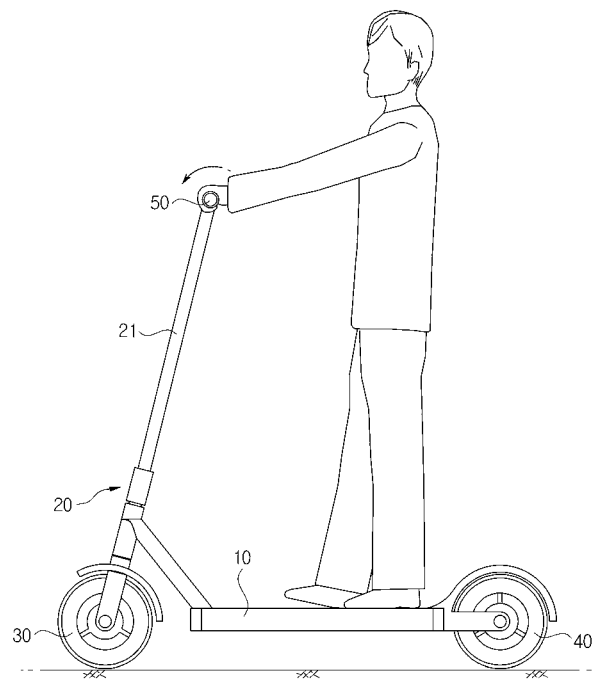

Referring to FIGS. 2 and 6, the handlebar 22 is rotatably coupled to the upper end of the steeling shaft 21. Therefore, a user may adjust the displacement direction of the grip part 50 by rotating the handlebar 22 as needed. That is, as illustrated in FIG. 7A, a relatively short user may adjust the displacement direction of the grip part 50 by rotating the handlebar 22 clockwise, and as illustrated in FIG. 7B, a relatively tall user may adjust the displacement direction of the grip part 50 by rotating the handlebar 22 counterclockwise. This is to increase the effect of reducing vibration or shock transmitted from the handlebar 22 to the grip part 50 by adjusting the displacement direction of the grip part 50 depending on an arm angle of a user.

As such, because the grip parts 50 are coupled to the opposite sides of the handlebar 22 and provide a buffer, the personal mobility according to the present embodiment may reduce vibration and shock transmitted to both of the grip parts 50 through the steering shaft 21 and the handlebar 22 when the personal mobility drives on an irregular road surface. Therefore, the personal mobility according to the present embodiment may provide a stable driving feeling to the user by preventing vibration of the grip parts 50 while driving on an irregular road surface.

As is apparent from the above, a personal mobility according to an embodiment of the disclosure can reduce vibration and shock transmitted to grip parts through a steering shaft and the handlebar when the personal mobility drives on an irregular road surface because the grip parts are coupled to the opposite sides of the handlebar to provide a buffer.

While the disclosure has been described in connection with certain embodiments, it will be understood that it is not intended to limit the invention to those particular embodiments. On the contrary, it is intended to cover all alternatives modifications, and equivalents included within the spirit and scope of the disclosure as defined by the appended claims.

The invention claimed is:

1. A personal mobility comprising:
a steering shaft;
a handlebar extending from an upper end of the steering shaft to opposite ends of the handlebar;
each end of the handlebar includes:
a grip part positioned on the end of the handlebar and being displaceable with respect to the handlebar in a direction intersecting a longitudinal direction of the handlebar;
a support plate attached to the end of the handlebar by a screw engaging a threaded bore in the end of the handlebar;
at least one buffer device provided between the grip part and the handlebar to reduce vibration or shock transmitted from the handlebar to the grip part;
the at least one buffer device further comprises one or more gas dampers interposed between an outer surface of the handlebar and an inner surface of the grip part in the displacement direction;
wherein the one or more gas dampers include:
a cylinder; and
a piston coupled to the cylinder, the piston configured to be moveable forward and backward, and being fixed to the inner surface of the grip part.

2. The personal mobility according to claim 1, wherein each grip part is limited in rotation and longitudinal displacement with respect to the handlebar.

3. The personal mobility according to claim 2, wherein each at least one buffer device comprises a plurality of springs interposed between the outer surface of the handlebar and the inner surface of the grip part in the displacement direction, and the plurality of springs are spaced apart from each other in a longitudinal direction of the grip part.

4. The personal mobility according to claim 2, wherein each one or more gas dampers includes a plurality of gas dampers interposed between the outer surface of the handlebar, the plurality of gas dampers are symmetrically positioned on opposite sides of a grip part coupling part of the end of the handlebar.

5. The personal mobility according to claim 1, wherein the handlebar is rotatably coupled to the upper end of the steering shaft.

6. The personal mobility according to claim 1, wherein each end further comprises:
a grip part coupling part;
the grip part comprising a coupling groove having a rectangular cross-section coupled to the outside of the grip part coupling part;
the coupling groove comprises a width in a first direction corresponding to a width of the grip part coupling part in the first direction, and a width in a second direction of intersecting the first direction being greater than a width of the grip part coupling part in the second direction.

* * * * *